United States Patent Office 2,700,671
Patented Jan. 25, 1955

2,700,671

DERIVATIVES OF 3.5-DIOXO-PYRAZOLIDINE

Franz Häfliger, Basel, Switzerland, assignor to J. R. Geigy A. G., Basel, Switzerland, a Swiss firm No Drawing. Application December 18, 1952, Serial No. 326,771

Claims priority, application Switzerland November 6, 1950

6 Claims. (Cl. 260—310)

The present invention is concerned with new derivatives of 3.5-dioxo-pyrazolidine and their salts. The new compounds correspond to the following general formula:

$$R-X-C_nH_{2n}-CH-CO$$
$$\qquad\qquad\qquad |\qquad\quad |$$
$$\qquad\qquad\quad CO\quad N-Aryl$$
$$\qquad\qquad\qquad\;\backslash\;/$$
$$\qquad\qquad\qquad\;N$$
$$\qquad\qquad\qquad\;|$$
$$\qquad\qquad\qquad\;Aryl \qquad\qquad (I)$$

wherein

R represents a lower alkyl or a lower alkenyl radical, a phenyl radical which can be substituted by halogen, methyl or lower alkoxy groups, or a benzyl radical which can be nuclear substituted by halogen, methyl or lower alkoxy groups,
X represents $-O-$, $-S-$, $-SO-$, or $-SO_2-$,
$n$ represents an integer from 1–4, and
Aryl represents a phenyl radical which can be substituted by lower alkoxy or lower alkylmercapto groups.

For example, R—X—$C_nH_{2n}$— may represent the following radicals: methoxy, ethoxy-, propoxy-, isopropoxy-, butoxy-, isobutoxy-, allyloxy-, crotyloxy-, phenoxy-,o,-m- and p-methylphenoxy-, o,p-dimethylphenoxy-, m,p-dimethylphenoxy, p-chlorophenoxy-, p-bromophenoxy-, o-, m-, and p-methoxyphenoxy-, p-ethoxyphenoxy-, benzyloxy-, o-, m-, and p-methylbenzyloxy-, p-chlorobenzyloxy-, p-bromobenzyloxy, o-, and p-methoxybenzyloxy- and p-ethoxybenzyloxy-, methyl, -ethyl, -propyl, -isopropyl, and butyl radicals and analogous radicals with S, SO or $SO_2$ instead of O as divalent radical X.

Besides the phenyl radical, aryl may represent for example the o- or p-methyl mercaptophenyl radical, the o- or p-ethyl mercaptophenyl radical, the o-, m-, or p-methoxyphenyl radical or the o-, m- or p-ethoxyphenyl radical.

The defined 1.2-diaryl-3.5-dioxo-pyrazolidines of Formula I are produced by condensation of suitable monosubstituted malonic acid derivatives with 1.2-diaryl hydrazines (hydrazobenzenes).

Thus a reactive derivative of a monosubstituted malonic acid of the formula:

$$R-X-C_nH_{2n}-CH-CO-Y$$
$$\qquad\qquad\qquad\quad |$$
$$\qquad\qquad\qquad\quad CO-Y \qquad\qquad (II)$$

wherein Y represents a radical of the carboxylic acid derivative which can be split off such as halogen (acid halide), or an alkoxy group (ester), can be reacted with 1.2-diaryl hydrazines of the formula:

$$\text{Aryl—NH—NH—Aryl} \qquad\qquad (III)$$

advantageously in the presence of a condensing agent or an acid binding agent. The reaction procedure is given in detail below.

A preferred method of manufacture consists in heating a dialkyl ester, above all the diethyl ester, of a monosubstituted malonic acid, with a diaryl hydrazine in the presence of a metal alcoholate, e. g. sodium ethylate or potassium tert. butylate. This brings about ring-closure with the splitting off of two molecules of the alcohol, which it is convenient to distil off, at temperatures between 100 and 200° C.

Generally such compounds come into consideration as condensing agents as are suitable for the replacement of a replaceable hydrogen atom by a metal atom, such as alkali metals and active alkali compounds.

Other ways of carrying out the same process are described below. These modifications consist in using other reactive derivatives instead of a di-ester of malonic acid of Formula II, such as, for example, a dihalide, an ester halide.

Condensation of a diarylhydrazine of Formula III with a malonic acid halide of Formula II, e. g., the dichloride, takes place in a solvent which is indifferent to the acid halide, such as ether or benzene. In order to repress as far as possible the rearrangement of the diaryl hydrazine by the halogen hydracid produced, it is advisable to carry out the condensation in the presence of an acid binding agent, preferably a tertiary organic base such as pyridine or dimethylaniline. In this case the reaction takes place even at low temperatures which may suitably be in the neighbourhood of 0° C.

The condensation can be carried out in steps especially if unsymmetrical reactive derivatives of malonic acid (Formula II) are used. For example, the ester chloride of a malonic acid can be treated with a diaryl hydrazine III to give firstly the acyl derivative IV, by allowing the components to react in the ratio of their molecular weights in ether or benzene in the presence of pyridine. Ring closure may then be brought about by heating with sodium ethylate:

$$R-X-C_nH_{2n}-CH-CO-O-\text{Alkyl}$$
$$\qquad\qquad\qquad\quad |$$
$$\qquad\qquad\qquad\quad CO\quad NH-Aryl$$
$$\qquad\qquad\qquad\;\;\backslash\;/$$
$$\qquad\qquad\qquad\;\;N$$
$$\qquad\qquad\qquad\;\;|$$
$$\qquad\qquad\qquad\;\;Aryl \qquad\qquad (IV)$$

Instead of a diaryl hydrazine of Formula III an N-acyl derivative of the same, e. g., N-acetyl-hydrazobenzene, can also be reacted with the reactive derivative of a malonic acid of Formula II, especially with a dialkyl ester. On heating with the condensing agents named, the acyl radical is split off, the ring closing to give the pyrazolidine derivative of Formula I.

The monosubstituted malonic acids and their reactive derivatives of the Formula II can easily be produced, esters for example by condensation of the sodium salt of malonic acid diethyl ester with compounds of the formula:

$$R-X-C_nH_{2n}-Z$$

wherein Z represents chlorine, bromine or iodine.

Another variation of the process for the production of the pyrazolidine derivative of Formula I consists in introducing the substituent into the 4-position of a 1.2-diaryl-3.5-dioxo-pyrazolidine of Formula V:

$$\qquad\qquad\quad \text{Aryl}$$
$$\qquad\qquad\quad\;\;|$$
$$\qquad\qquad\quad\;\;N$$
$$\qquad\qquad\;/\quad\;\backslash$$
$$\qquad\qquad CO\quad N-\text{Aryl}$$
$$\qquad\qquad\;|\qquad\;|$$
$$\qquad\qquad CH_2-CO \qquad\qquad (V)$$

by hydrogenating the diketopyrazolidine V in the presence of a carbonyl compound of the formula:

$$R-X-C_{n-1}H_{2(n-1)}-CHO$$

or by hydrogenating the condensation product VI derived for example from the dioxo-pyrazolidine V and the carbonyl compound $R-X-C_{n-1}H_{2(n-1)}-CHO$:

$$\qquad\qquad\qquad \text{Aryl}$$
$$\qquad\qquad\qquad\;\;|$$
$$\qquad\qquad\qquad\;\;N$$
$$\qquad\qquad\quad\;/\quad\;\backslash$$
$$\qquad\qquad\;\;CO\quad N-\text{Aryl}$$
$$\qquad\qquad\qquad|\qquad\;|$$
$$R-X-C_{n-1}H_{2(n-1)}-CH=C\quad\;-CO \qquad (VI)$$

In both cases, hydrogenation is preferably carried out with hydrogen in the presence of a catalyst, such as finely divided nickel, platinum or palladium. Other reducing procedures, such as the use of sodium amalgam and water offer no advantages over this method.

However, it must be noted in connection with this process that when the radical R contains an aliphatic double bond it is difficult to avoid hydrogenating it and the yield in such circumstances is usually unsatisfactory. On the other hand the corresponding saturated derivative can be easily prepared. Consequently the process is primarily suitable for the manufacture of those pyrazolidine derivatives of Formula I in which the radical R contains no aliphatic double bonds.

The dioxo-pyrazolidines of Formula V can be prepared by the methods known per se for the manufacture of 1.2-diphenyl-3.5-dioxo-pyrazolidine; the most suitable is the condensation of malonic ester with the corresponding diaryl hydrazine of Formula III in the presence of a metal alcoholate, e. g. sodium ethylate.

The substituted pyrazolidine derivatives of Formula VI are derived from the unsubstituted parent compounds V by methods known per se (Bl. Chem. Soc. Japan, 1931, 6, 1–9, 1932, 7, 45–50).

The 1.2-diaryl-3.5-dioxo-pyrazolidines of Formula I preparable according to the invention are intended for use as therapeutics. They have favourable analgetic, antipyretic and antiphlogistic properties.

The new compounds form salts with basic compounds. The alkali metal salts and those with organic bases such as diethyl amine, ethylene diamine or triethanolamine are very readily soluble in water. Such aqueous salt solutions are effective as solubility promoters for some medicaments such as, for example, 1-phenyl-2.3-dimethyl-4-dimethylamino-pyrazolone, which are difficulty soluble in water.

To prepare the soluble salts, the free pyrazolidine of Formula I is treated with an equimolecular quantity of a base containing the desired cation, e. g. with aqueous caustic soda, ethylene diamine, potassium hydroxide lye or sodium carbonate solution or with alcoholic caustic soda. It is best to employ stirring or shaking during the reaction. If an aqueous lye is used, then an excess of the pyrazolidine may be present, which, after the solution is neutral to phenolphthalein, can be removed by filtration.

The salt can be obtained in solid form when desired either by evaporation of the filtered solution or by adding a solvent in which the salt is insoluble, for example, by the addition of ether to an alcoholic solution of the sodium salt.

However, it is also possible to obtain the corresponding salt directly when using alkaline condensing agents, such as for example, sodium ethylate.

The alkali salts are obtained in the form of colourless powders which are readily soluble in water and alcohol. Their solutions do not turn phenolphthalein red.

The difficulty soluble salts can be also prepared by double decomposition of an alkali or ammonium salt of a pyrazolidine of Formula I with a soluble alkaline earth or heavy metal salt, e. g. calcium chloride or silver nitrate. When working with a sufficiently concentrated solution, the salts are obtained directly as precipitates. Alternatively they can be isolated by suitably concentrating or cooling the solution.

In the following examples a few methods of carrying out the manufacture as well as some of the compounds obtained are described in more detail. Parts are by weight. The relationship of parts by weight to parts by volume is that of kilogrammes to litres. The temperatures are in degrees centigrade.

*Example 1*

12 parts of sodium are dissolved in 200 parts of abs. ethyl alcohol. 108 parts of β-methyl mercapto ethyl malonic ester and then 81 parts of hydrazobenzene are added to this solution. The alcohol is distilled off while stirring and the mixture is finally kept at 165–175° for 6 hours. 500 parts of water and 100 parts carbon tetrachloride are then added to the cooled reaction mass and the whole is stirred until a solution is obtained. The carbon tetrachloride is separated and the aqueous solution shaken out twice with carbon tetrachloride. To purify, the aqueous solution is filtered over activated charcoal and the filtrate is acidified. 1.2-diphenyl-3.5-dioxo-4-(β-methyl mercapto ethyl)-pyrazolidine precipitates and on recrystallisation from alcohol has a melting point of 120–121°.

The following compounds for example can be prepared in the same manner:

1.2-diphenyl-3.5-dioxo-4-(β-ethylmercapto ethyl)-pyrazolidine M. P. 92°,
1.2-diphenyl-3.5-dioxo-4-(β-n-propylmercapto ethyl)-pyrazolidine M. P. 94–96°,
1.2-diphenyl-3.5-dioxo-4-(β-isopropyl mercapto ethyl)-pyrazolidine, M. P. 105–107°,
1.2-di-(o-methylmercapto phenyl)-3.5-dioxo-4-(β-isobutyl mercapto ethyl)-pyrazolidine,
1.2 - di - (p - methylmercapto - phenyl) - 3.5 - dioxo - 4-(β-methylmercapto isopropyl)-pyrazolidine,
1.2 - di - (p - anisyl) - 3.5 - dioxo - 4 - ethylmercapto-methyl-pyrazolidine,
1.2-diphenyl-3.5-dioxo-4-(γ-allylmercapto propyl)-pyrazolidine,
1.2-diphenyl-3.5-dioxo-4-(β-ethylsulfinyl ethyl)-pyrazolidine, M. P. 181–182°, and
1.2-diphenyl-3.5-dioxo-4-(β-ethylsulfonyl ethyl)-pyrazolidine.

*Example 2*

An ethylate solution is prepared from 12 parts of sodium and 200 parts of abs. ethanol and then 100 parts of β-methoxyethyl malonic ester and 81 parts of hydrazobenzene are added to it. The alcohol is distilled off while stirring and the whole is heated at 165–175° for 6 hours. The cooled reaction mixture is dissolved in water and the cloudy aqueous solution is shaken out with carbon tetrachloride. The separated aqueous solution is purified with activated charcoal. On acidifying the solution, 1.2-diphenyl-3.5-dioxo-4-(β-methoxyethyl)-pyrazolidine is obtained which after recrystallisation from alcohol melts at 117–118°.

The following compounds for example can be prepared in the same manner:

1.2 - diphenyl - 3.5 - dioxo - 4 - (β - n - propoxy - ethyl) - pyrazolidine, M. P. 90–92°,
1.2 - diphenyl - 3.5 - dioxo - 4 - (β - isopropoxy - ethyl) - pyrazolidine, M. P. 104–106°,
1.2 - diphenyl - 3.5 - dioxo - 4 - (β - n - butoxy - ethyl) - pyrazolidine, M. P. 93–95°,
1.2 - di - (p - anisyl) - 3.5 - dioxo - 4 - (β - methoxy - ethyl)-pyrazolidine,
1.2 - di - (p - ethoxy - phenyl) - 3.5 - dioxo - 4 - (β - methoxy-ethyl)-pyrazolidine,
1.2 - di - (p - methylmercapto - phenyl) - 3.5 - dioxo - 4-(β-ethoxy-isopropyl)-pyrazolidine.
1.2 - diphenyl - 3.5 - dioxo - 4 - (δ - allyloxy - butyl) - pyrazolidine, and
1.2 - di - (p - ethoxy - phenyl) - 3.5 - dioxo - 4 - ethoxy-methyl-pyrazolidine.

*Example 3*

296 parts of (β-phenylmercapto-ethyl)-malonic acid diethyl ester and then 203 parts of hydrazobenzene are added while stirring to a warm sodium ethylate solution obtained from 23 parts of sodium and 400 parts by volume of abs. alcohol. About half the alcohol is then distilled off, after which 200 parts by volume of abs. xylene are gradually added without removing the inclined condenser. The temperature of the oil bath is kept at about 130° for 12 hours while continuously stirring so that the alcohol still present and that which is liberated distills off but the xylene remains as solvent.

After cooling, 400 parts by volume of water are stirred in. The aqueous layer is separated from the xylene, shaken out twice with 40 parts by volume of chloroform and then made acid to Congo red paper with concentrated hydrochloric acid. The oil which separates, is taken up in ethyl acetate and the solution obtained is washed with water. After drying over sodium sulphate the solvent is distilled off under reduced pressure and the residue is recrystallised from alcohol. 1.2-diphenyl-3.5-dioxo-4-(β-phenylmercapto-ethyl)-pyrazolidine melts at 106–108°.

The following compounds for example can be prepared in the same manner:

1.2 - diphenyl - 3.5 - dioxo - 4 - [β - (p - methylphenyl-mercapto)-ethyl]-pyrazolidine, M. P. 101–103°,
1.2 - diphenyl - 3.5 - dioxo - 4 - [β - (o.p - dimethyl-phenylmercapto)-ethyl]-pyrazolidine, M. P. 104–105°,
1.2 - diphenyl - 3.5 - dioxo - 4 - [β - (p - chlorophenyl-mercapto)-ethyl]-pyrazolidine, M. P. 117–119°,
1.2 - diphenyl - 3.5 - dioxo - 4 - [β - (p - bromophenyl-mercapto)-ethyl]-pyrazolidine,
1.2 - diphenyl - 3.5 - dioxo - 4 - [β - (p - methoxyphenyl-merpato)-ethyl]-pyrazolidine,
1.2 - di - (p - methylmercapto - phenyl) - 3.5 - dioxo - 4-(β-phenylmercapto-ethyl)-pyrazolidine,
1.2 - diphenyl - 3.5 - dioxo - 4 - (γ - phenylmercapto-propyl)-pyrazolidine, M. P. 112–115°, 1.2 - diphenyl - 3.5 - dioxo - 4 - (δ - phenylmercapto-butyl)-pyrazolidine, M. P. 121–122°, 1.2 - diphenyl - 3.5 - dioxo - 4 - (β - phenoxy - ethyl)-pyrazolidine, M. P. 147°, 1.2 - diphenyl - 3.5 - dioxo - 4 - (δ - phenoxy - butyl)-pyrazolidine, 1.2 - diphenyl - 3.5 - dioxo - 4 - (β - phenylsulfinyl - ethyl)-pyrazolidine, 1.2 - diphenyl - 3.5 - dioxo - 4 - phenylsulfonylmethyl - pyrazolidine, 1.2 - diphenyl - 3.5 - dioxo - 4 - [β - (p - chlorophenyl-sulfonyl)-ethyl]-pyrazolidine, 1.2 - diphenyl - 3.5 - dioxo - 4 - (β - benzylmercapto - ethyl)-pyrazolidine, 1.2 - diphenyl - 3.5 - dioxo - 4 - (δ - benzylmercapto - butyl)-pyrazolidine, 1.2 - diphenyl - 3.5 - dioxo - 4 - β - (p-cholorobenzyl-sulfinyl)-ethyl-pyrazolidine, 1.2 - diphenyl - 3.5 - dioxo 4 - [β - (p - methoxybenzyl-sulfonyl)-ethyl]-pyrazolidine, 1.2 - diphenyl - 3.5 - dioxo - 4 - (δ - benzyloxy - butyl) - pyrazolidine, and 1.2 - di - (p - methoxyphenyl) - 3.5 - dioxo - 4 - (p - methylbenzyloxymethyl)-pyrazolidine.

*Example 4*

25 parts (0.1 mol) of 1.2-diphenyl-3.5-dioxo-pyrazolidine and 12.2 parts (0.14 mol) of ethoxy acetaldehyde in 500 parts of ethyl alcohol are hydrogenated in the presence of 0.5 part of platinum-charcoal catalyst at 40–50° under atmospheric pressure until the hydrogen is not taken up any more. After cooling, the catalyst is filtered off and the solvent (together with the ethoxy ethyl alcohol which is also formed, is distilled off leaving 1.2-diphenyl-3.5-dioxo-4-ethoxy ethyl pyrazolidine. On recrystallisation from cyclohexane it melts at 78–79°.

The present application is a continuation-in-part of copending application, Serial No. 253,227, filed October 25, 1951, now abandoned.

What I claim is:

1. A member selected from the group consisting of 3.5-dioxo-pyrazolidines having the general formula:

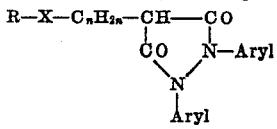

and alkali salts thereof, wherein R represents a radical selected from the group consisting of lower alkyl, lower alkenyl, phenyl, halogen-phenyl, methylphenyl, lower alkoxyphenyl, benzyl, halogen-benzyl, methylbenzyl and lower alkoxybenzyl; X represents a member selected from the group consisting of O, S, SO, and $SO_2$; $n$ represents an integer from 1–4 and Aryl represents a member selected from the group consisting of phenyl, lower alkoxyphenyl and lower alkylmercapto phenyl.

2. The 1.2 - diphenyl - 3.5 - dioxo - 4 - (β - phenylmer-captoethyl)-pyrazolidine of the formula:

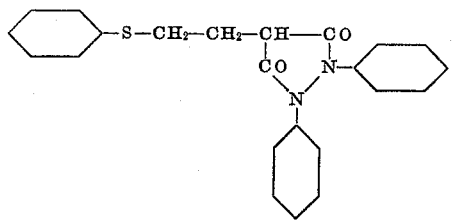

3. 1.2 - diphenyl - 3.5 - dioxo - 4 - (β - methylmercapto-ethyl)-pyrazolidine.

4. 1.2 - diphenyl - 3.5 - dioxo - 4 - (β - isopropyl-mercapto-ethyl)-pyrazolidine.

5. 1.2 - diphenyl - 3.5 - dioxo - 4 - (β-ethoxy - ethyl) - pyrazolidine.

6. 1.2 - diphenyl - 3.5 - dioxo - 4 - (β - phenoxy - ethyl)-pyrazolidine.

References Cited in the file of this patent

UNITED STATES PATENTS 2,562,830   Stenzl ---------------- July 31, 1951